Dec. 21, 1948.　　S. B. UNDERWOOD ET AL　　2,456,847
SAW STABILIZER FOR SAW FILING MACHINES
Filed June 3, 1946　　2 Sheets-Sheet 1

INVENTOR.
Sylvester B. Underwood
Lulu Mae Underwood
BY
ATTORNEYS.

Dec. 21, 1948.  S. B. UNDERWOOD ET AL  2,456,847
SAW STABILIZER FOR SAW FILING MACHINES
Filed June 3, 1946  2 Sheets-Sheet 2
FIG. 3.
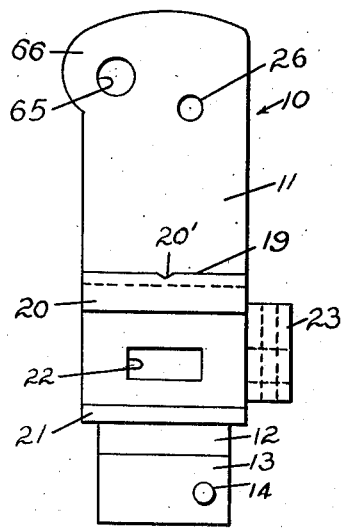
FIG. 4.
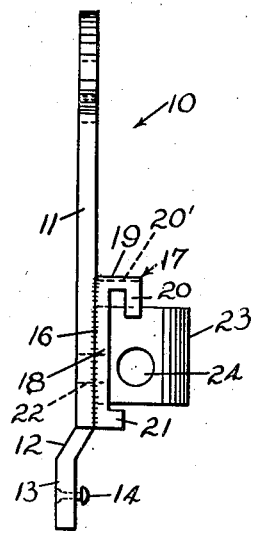
FIG. 5.
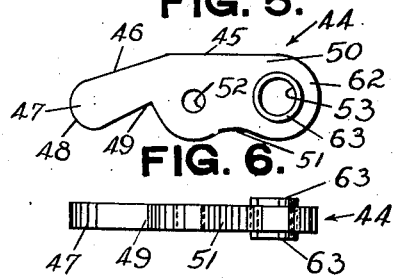
FIG. 6.
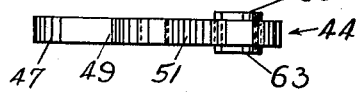
FIG. 7.
FIG. 8.
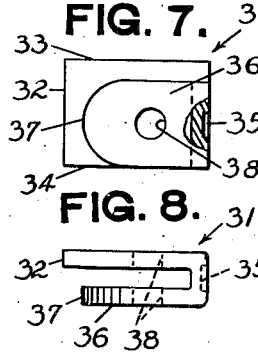
FIG. 9.
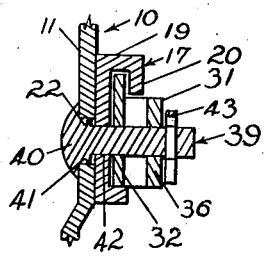
INVENTOR.
Sylvester B. Underwood
Lulu Mae Underwood
BY
ATTORNEYS.

Patented Dec. 21, 1948

2,456,847

UNITED STATES PATENT OFFICE 2,456,847

SAW STABILIZER FOR SAW FILING MACHINES

Sylvester B. Underwood and Lulu Mae Underwood, Santa Cruz, Calif., assignors to Foley Manufacturing Company, Minneapolis, Minn., a corporation of Minnesota Application June 3, 1946, Serial No. 673,936

7 Claims. (Cl. 76—77)

This invention relates generally to saw filing machines of the Foley type, such as are shown in Patents Nos. 1,674,853; 2,310,517 and 2,343,171; and more particularly to improved saw stabilizing means associable therewith for positioning a saw therein during filing, the primary object of this invention being to provide means for positioning a saw in correct filing position and positively holding the saw exactly in such position before, during, and after each application of the file thereto, in such manner that in the progressive step-by-step travel of the saw characteristic of such machines, the successive teeth of the saw are caused to be uniformly and similarly filed, whereby overcutting or undercutting of one or the other edges of the saw teeth, ordinarily resulting from shifting of the saw in the machine due to the camming effect produced thereon by the taper of the file, are eliminated, with the result that a saw can be precision processed in a single pass through the machine, instead of having to be processed several times to obtain the desired uniformity in the size and cut of the teeth.

Another important object of this invention is to provide saw stabilizing means of the character indicated above which can be associated with saw filing machines of the type indicated without requiring rearrangement or mutilation of the parts thereof or any change in their manner of operation.

A further important object of this invention is to provide saw stabilizing means of the character indicated hereinabove which can be actuated by the existing spacing pawl operating mechanism and does not require any other or additional mechanism for its actuation.

A further important object of this invention is to provide saw stabilizing means of the character indicated above which is operated automatically in coordination with the operation of the spacing pawl of the control disk of the saw filing machine, so that as soon as the file has completed a stroke said means disengages from the saw to permit the spacing pawl to advance the saw into position for the filing of the next tooth and then reengages the saw so as to hold the saw immovable during the filing of said next tooth.

A still further important object of this invention is to provide saw stabilizing means of the character indicated above which can be quickly and easily installed on saw filing machines of the type indicated, and which is composed of but few simple and inexpensive parts.

Other important objects and features of this invention will be apparent from the following description and the accompanying drawings, wherein, merely for purposes of illustration, a presently preferred but non-limitative embodiment is set forth in detail.

In the drawings, wherein like numerals designate like parts throughout the several views:

Figure 1 is a general front perspective view of a portion of a Foley type saw filing machine, showing the spacing pawl, control disk and file thereof, and the saw stabilizing means of the present invention associated therewith, with the control disk in depressed position and the spacing pawl in consequent withdrawn inoperative position, and the saw stabilizing means engaged to hold the saw immovable for the pass of the file.

Figure 3 is a front elevation of the base plate.

Figure 4 is a left hand side or edge elevation of the base plate.

Figure 5 is a front elevation of the rocker arm.

Figure 6 is a bottom plan view thereof.

Figure 7 is a front elevation of the stirrup for the locking pawl, partly broken away to show the recess for receiving the end of the adjusting screw.

Figure 8 is a top plan view thereof.

Figure 9 is a fragmentary transverse vertical sectional view taken on the line 9—9 of Figure 2.

Figure 1:
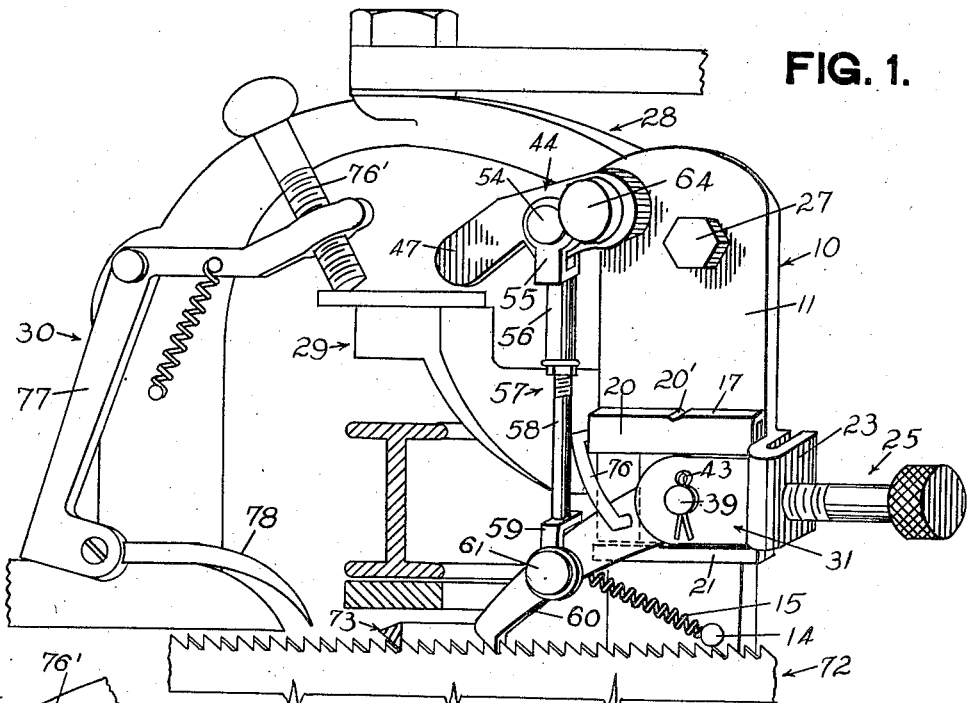

The invention in general comprises a unit adapted to be bolted on the saw filing machine from bracket on the opposite side of the control disk from the spacing pawl mechanism, the said unit comprising a pivoted locking pawl arranged to be spring pressed into position in the gullet between two of the saw teeth on that part of the saw which has advanced beyond the spacing pawl and the file, when freed to do so by downward movement of the control disk, so that longitudinal shifting of the saw to either side of the position given it by the operation of the spacing pawl is positively precluded during a filing operation, the rising of the locking pawl out of said gullet and free from the saw awaiting completion of the pass of the file across the particular saw tooth and rising of the control disk in the movement thereof which actuates the spacing pawl for advancing the saw to position the next succeeding tooth for filing.

The particular form of saw stabilizing unit selected for disclosing the present invention herein and which is shown in detail in the accompanying drawings comprises the base 10 which comprises a relatively thick vertically elongated, generally rectangular flat plate 11 having a lower rearwardly angulated part 12 resulting in a narrow horizontally elongated rearwardly outset portion 13, having a forwardly projecting headed pin 14 near its right hand end for anchoring one end of helical locking pawl tensioning spring 15.

Welded at 16 to the front of the plate 11 above the angulated portion 12 is the locking pawl stirrup guide 17 which comprises the flat horizontally elongated plate portion 18 having its upper edge formed to provide the forwardly projecting horizontal flange 19 terminating in the depending vertical flange 20, the middle of the flange 19 being provided in its top with a transverse groove 20'. The plate portion 18 has a forwardly projecting horizontal flange 21 on its lower edge, and is formed midway between the flanges 19 and 21 with a centralized relatively short horizontally elongated slot 22.

A U-shaped adjusting screw bracket 23 is provided by bending forwardly and rearwardly a portion on the right hand edge of the base plate 11 and threading horizontally through the openings 24 therein the adjusting screw 25 on a level intermediate the flanges 19 and 21 and in vertical alignment with the flange 20 of the stirrup guide 17.

The upper right hand corner portion of the base plate 11 is provided with a bolt hole 26 through which passes the bolt 27, by means of which the base 10 is mounted on the front of the saw filing machine frame bracket 28 in the same relative position at the right hand side of the control disk 29 that is occupied by the spacing pawl mechanism 30 at the left hand side of said control disk.

The stirrup 31 which is slidably reciprocable in the guide 17 comprises the generally rectangular plate portion 32 with its upper edge 33 confined in the channel defined by the upper guide flanges 19 and 20 and its lower edge 34 riding on the lower guide flange 21. The right hand edge of the plate 32 has a portion spaced below the lower end of the guide flange 20 which is bent forwardly and toward the left in front of the plate so as to define the bight portion recessed at 35 to seat the end of the adjustable stop screw 25, and the parallel arm 36, whose left hand end is rounded at 37 and spaced from the left hand end of the plate 32, and which is provided intermediate its ends with the hole 38 for the locking pawl mounting pin 39.

The pin 39, as shown in Figure 9, has a head 40 sliding against the back of the base plate 11 including a squared portion 41 conformably sliding in the base plate slot 22, with the shank of the pin extending forwardly through the slot 42 in the guide which registers with the slot 22, and through the holes 38 in the stirrup 31, with a cotter pin or the like 43 traversing its forward end in front of the stirrup to hold it in place.

The rocker arm 44 comprises an elongated flat plate having a relatively straight upper longitudinal edge 45 from whose left hand end declines the upper edge 46 of the finger 47, which is rounded at its free end at 48 and is defined as to width and angularity by the notch 49 in the lower edge of the plate 50. Said lower edge is indented at 51 midway between two bearing areas which surround holes 52 and 53. The smaller hole 52 is plain and accommodates the pivot pin 54 which traverses the arms of the yoke 55 on the upper end of the tubular upper part 56 of the connecting link 57, which includes the lower part 58 which is threadably adjustable in the upper part 56 and has a yoke 59 on its lower end straddling the locking pawl 60 with the pivot pin 61 extended therethrough to make the pivotal connection therewith.

The rounded heel portion 62 of the rocker arm 44 contains the larger hole 53, which is surrounded on both sides of the rocker arm by spacing elements 63, and which is pivoted on the headed pin 64 which is mounted in the hole 65 provided in the laterally extended upper left hand corner portion 66 of base plate 11.

The locking pawl 60 projects toward the left in the direction opposite the travel of the saw 72, is flat sided and has its heel pivoted on the pin 39 between the plate 32 and the plate 36 of the stirrup 31. The upper and the lower edges 67 and 68 of the locking pawl may be slightly downwardly and forwardly curved, with the nose of the pawl characterized by a straight edge 69 angulated to conformably abut the forward edge 70 of any of the teeth 71 of the saw 72 when the locking pawl is in the depressed operative position shown in Figure 1, whereby shifting of the saw in a right hand direction during the pass arross a tooth of the file 73 is positively prevented.

The said edge 69 extends below the lower edge 68 of the pawl and the resultant projection is angulated as indicated at 74 to conformably abut the perpendicular saw tooth edges 75 so that shifting of the saw in the left hand direction is also prevented while the locking pawl is in its depressed operative position in the gullet defined by the edges 70 and 75 between any two adjacent saw teeth 71.

The locking pawl is spring pressed toward its depressed operative position by the spring 15 which is stretched between the headed pin 14 on the base 10 and the pin 61 connecting the lower end of the adjustable link 57 with the locking pawl.

Figure 2:
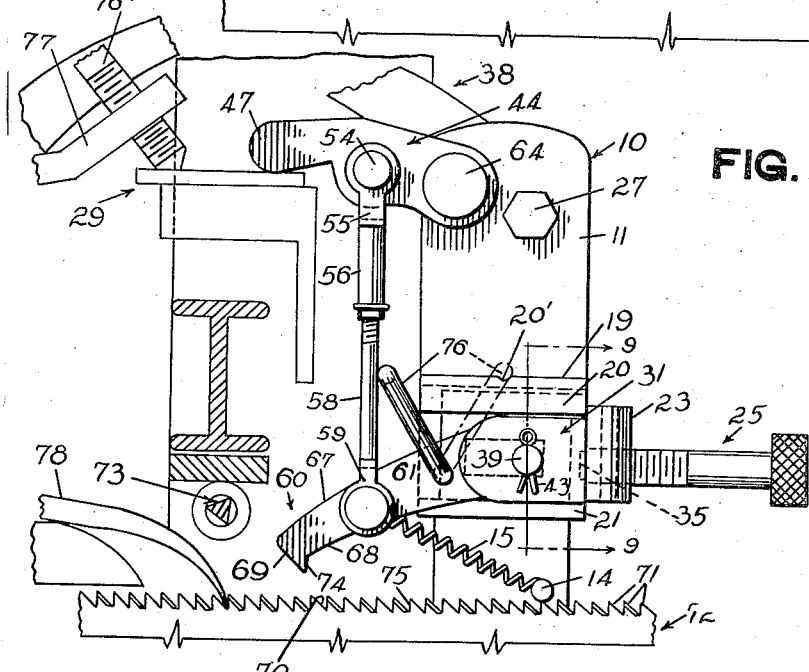
Figure 2 is a fragmentary front elevation showing the control disk in elevated position in which the spacing pawl is engaged with the saw and the saw stabilizing means is withdrawn from the saw.

For holding the locking pawl up out of the way when not in use a U-shaped trigger 76 is provided which has its lower arm thereof pivotally traversing the locking pawl 60 at a point between the pin 61 and the stirrup 31 and its upper arm arranged to occupy an inoperative position to the left of the base 10, as shown in full lines in Figure 2, in which position of the trigger the locking pawl is free to act, or to be forced over to snap into the notch 20' in the top of the upper flange 19 of the guide 17, as shown in dotted lines in Figure 2, in which position the locking pawl is elevated out of contact with the saw 72 and the rocker arm 44 is elevated with its nose 47, out of reach of the control disk 29.

The nose 47 of the rocker arm 44 is ordinarily positioned to be engaged by the adjacent side of the top of the control disk 29, the opposite side of which is engageable with the adjustment screw 76' of the bellcrank lever 77 which carries the spacing pawl 78 on the Foley type of saw filing machines, with the spacing pawl projecting in the right hand direction of travel of the saw 72.

The saw stabilizing unit having been bolted in place on the machine as above described, it is adjusted for operation as follows:

The saw filing machine is cranked by hand, as is usual in starting it, in order to adjust the file 73 to the desired cutting position on a tooth 71 of the saw 72, whereupon the motor (not shown) is started. As the locking pawl 60 subsides into engagement with a saw tooth, the adjusting screw 25 is turned in either direction until the nose of the locking pawl drops into full engagement with the gullet between two adjacent teeth, as shown in Figure 1, wherein it fully abuts the tooth edges 70 and 75.

The locking pawl 60 will then be started and will continue to be operated automatically with the spacing pawl 78 by the rise and fall of the control disk 29.

If needed the length of the link 57 is adjusted so that the nose of the locking pawl will remain fully in the gullet between two adjacent saw teeth for the entire time of the passage of the file 73 across the saw tooth, so that for this period of time the saw is held immovable. With the correct adjustment, as soon as the file 73 has completed its pass, it and the locking pawl 60 will rise out of engagement with the saw teeth, and the spacing pawl then acts to advance the saw 72 the space of one tooth in the right hand direction, thereby presenting the next tooth for filing.

As soon as the spacing pawl 78 has moved the saw forwardly and has retreated out of contact with the saw, the stabilizer's locking pawl 60 drops into the gullet between the next adjacent saw teeth and remains therein to hold the saw immovable during the ensuing filing operation. These actions are automatically repeated until the remaining teeth of the saw have been filed

What is claimed is:

1. A saw filing machine comprising tooth filing means, means for supporting a saw relative to said filing means whereby the saw can be advanced to present successive teeth for filing by said filing means, a normally retracted spacing pawl, a reciprocating control disk intermittently engageable with said spacing pawl for advancing the saw stepwise on said supporting means to present successive teeth of the saw for filing by said filing means, a locking pawl, said locking pawl having a nose formed to conformably engage in the gullets defined between adjacent saw teeth, spring pressed means arranged to force the nose of the locking pawl into a gullet so as to positively prevent movement of the saw in either a retreating or advancing direction while the filing means is operating upon a tooth of the saw and said spacing pawl is retracted, and locking pawl operating means comprising a rocker pivoted on said machine and operatively connected to said locking pawl, said rocker being arranged to be intermittently engaged by said control disk to effect withdrawal of said locking pawl from the saw against the resistance of said spring pressed means while said spacing pawl is being operated to advance the saw on said supporting means, and a support for said locking pawl comprising a bracket secured to said machine, a guide secured to the bracket, a stirrup slidably confined in said guide, means pivotally mounting the locking pawl on said stirrup, and adjustable stop means engageable with said stirrup to limit movement of said stirrup along said guide in one direction.

2. A saw filing machine comprising tooth filing means, means for supporting a saw relative to said filing means whereby the saw can be advanced to present successive teeth for filing by said filing means, a normally retracted spacing pawl, a reciprocating control disk intermittently engageable with said spacing pawl for advancing the saw stepwise on said supporting means to present successive teeth of the saw for filing by said filing means, a locking pawl, said locking pawl having a nose formed to conformably engage in the gullets defined between adjacent saw teeth, spring pressed means arranged to force the nose of the locking pawl into a gullet between adjacent saw teeth to positively prevent movement of the saw in either a retreating or advancing direction while the filing means is operating upon a tooth of the saw and said spacing pawl is retracted, and locking pawl operating means comprising a rocker operatively connected to said locking pawl, said rocker being arranged to be intermittently engaged by said control disk to effect withdrawal of said locking pawl from the saw against the resistance of said spring pressed means while said spacing pawl is being operated to advance the saw on said supporting means, and a support for said locking pawl comprising a bracket secured to said machine, a guide secured to the bracket, a stirrup slidably confined in said guide, means pivotally mounting the locking pawl on said stirrup, and adjustable stop means engageable with said stirrup to limit movement of said stirrup along said guide in one direction, said bracket comprising pivot means supporting said rocker, and link means operatively connected to and between said rocker and said locking pawl.

3. A saw stabilizing attachment for a saw filing machine of the type having tooth filing means, a saw support for supporting a saw relative to said filing means whereby the saw can be advanced to present successive teeth thereof for filing, a normally retracted spacing pawl, a reciprocating control disk at one side of said spacing pawl, said control disk being operative to impart intermittent operation to said spacing pawl for producing stepwise advancement of the saw to present succeeding teeth to said filing means, said saw stabilizing attachment comprising a unit comprising a base adapted to be mounted on said machine over said saw support at the side of said control disk opposite said spacing pawl, a locking pawl, means pivoting said locking pawl on said base for movement toward and away from said saw support, a nose on said pawl adapted to conformably engage a gullet defined between adjacent teeth of the saw, a spring constantly urging the nose of the locking pawl into one of said gullets for positively preventing advancing or retreating movement of the saw on said support during a filing operation and while said spacing pawl is retracted, a rocker pivoted on said base, a link operatively connecting said rocker with said locking pawl, said rocker being arranged to be operatively engaged by said control disk after completion of a filing operation thereby to effect withdrawal of said locking pawl from engagement with the saw against the resistance of said spring to free the saw for advancement by operation of said spacing pawl.

4. A saw stabilizing attachment for a saw filing machine of the type having tooth filing means, a saw support for supporting a saw relative to said filing means whereby the saw can be advanced to present successive teeth thereof for filing, a normally retracted spacing pawl, a reciprocating control disk at one side of said spacing pawl, said control disk being operative to impart intermittent operation to said spacing pawl for producing stepwise advancement of the saw to present succeeding teeth to said filing means, said saw stabilizing attachment including a unit comprising a base adapted to be mounted on said machine over said saw support at the side of said control disk opposite said spacing pawl, a locking pawl, means pivoting said locking pawl on said base for movement toward and away from said saw support, a nose on said pawl adapted to conformably engage a gullet defined between adjacent teeth of the saw, a spring constantly urging the nose of the locking pawl into one of said gullets for positively preventing advancing or retreating movement of the saw on said support during a filing operation and while said spacing pawl is retracted, a rocker pivoted on said base, a link operatively connecting said rocker with said locking pawl, said rocker being arranged to be operatively engaged by said control disk after completion of a filing operation thereby to effect withdrawal of said locking pawl from engagement with the saw against the resistance of said spring to free the saw for advancement by operation of the spacing pawl, said means pivoting said locking pawl on the base comprising a stirrup mounted for slidable movement relative to said base, and an adjustable stop screw threaded in a portion of said base and engageable with said stirrup to selectively limit movement of said stirrup in said one direction against the tension of said spring.

5. A saw stabilizing attachment for a saw filing machine of the type having tooth filing means, a saw support for supporting a saw relative to said filing means whereby the saw can be advanced to present successive teeth thereof for filing, a normally retracted spacing pawl, a reciprocating control disk at one side of said spacing pawl, said control disk being operative to impart intermittent operation to said spacing pawl for producing stepwise advancement of the saw to present succeeding teeth to said filing means; said saw stabilizing attachment including a unit comprising a bracket adapted to be mounted on said machine over said saw support at the side of said control disk opposite said spacing pawl, a locking pawl, means pivotally mounting said locking pawl on said bracket for movement toward and away from said saw support, a nose on said pawl adapted to conformably engage a gullet defined between adjacent teeth of the saw, a spring stretched for holding the nose of the locking pawl in one of the gullets of the saw for positively preventing advancing or retreating movement of the saw on said support during a filing operation and while said spacing pawl is retracted, a rocker pivoted on said bracket, a link operatively connecting said rocker with said locking pawl, said rocker being arranged to be operatively engaged by said control disk after completion of a filing operation thereby to effect withdrawal of said locking pawl from engagement with the saw against the resistance of said spring to free the saw for advancement by operation of the spacing pawl, said means pivotally mounting said locking pawl on said bracket comprising a stirrup having a pivot pin swingably supporting said locking pawl, a guide on said bracket in which said stirrup is slidable to vary the reach of the nose of said locking pawl relative to the saw filing means to assure accurate positioning of the saw with respect to the saw filing means for each movement of the saw, and an adjusting screw threaded in a portion of said bracket for engagement with said stirrup to limit the movement of the stirrup in said guide in one direction.

6. The combination with a saw filing machine comprising tooth filing means, means for supporting a saw relative to said filing means and whereby the saw may be advanced to present successive teeth for filing by said filing means, a normally retracted saw-advancing pawl, and means for actuating said pawl to cause it to intermittently engage the saw teeth and present successive teeth of the saw for filing by said filing means, of a saw stabilizing attachment comprising a locking pawl having its nose shaped to engage in the gullets between adjacent saw teeth to lock the saw against longitudinal movement in either direction during the operation of said filing means, a bracket secured to the machine frame and having a stirrup mounted for sliding movement therein in a direction substantially parallel to the saw teeth, said stirrup providing a pivotal support for said locking pawl, spring means constantly urging the locking pawl into locking engagement with the saw teeth, and a rocker pivotally suported on said bracket above the locking pawl and having an operative connection with the locking pawl, one end of said rocker being positioned to be engaged by the actuating means for the saw-advancing pawl whereby the locking pawl is operated to release the saw each time the saw-advancing pawl is actuated to advance the saw.

7. The combination with a saw filing machine comprising tooth filing means, means for supporting a saw relative to said filing means and whereby the saw may be advanced to present successive teeth for filing by said filing means, a normally retracted saw-advancing pawl, and means for actuating said pawl to cause it to intermittently engage the saw teeth and present successive teeth of the saw for filing by said filing means, of a saw stabilizing attachment comprising a locking pawl having its nose shaped to engage in the gullets between adjacent saw teeth to lock the saw against longitudinal movement in either direction during the operation of said filing means, a bracket secured to the machine frame and having a stirrup mounted for sliding movement therein in a direction substantially parallel to the saw teeth, said stirrup providing a pivotal support for said locking pawl, spring means constantly urging the locking pawl into locking engagement with the saw teeth, a rocker pivotally supported on said bracket above the locking pawl, and having an operative connection with said pawl, one end of said rocker being positioned to be engaged by the actuating means for the saw-advancing pawl whereby the locking pawl is operated to release the saw each time the saw-advancing pawl is actuated to advance the saw, and an element having one end pivotally connected to the locking pawl and its opposite end adapted to engage a fixed portion of the bracket, thereby to render the locking pawl inoperative to engage the saw teeth.

SYLVESTER B. UNDERWOOD.
LULU MAE UNDERWOOD.

REFERENCES CITED

The following references are of record in the file of this patent:

UNITED STATES PATENTS

| Number | Name | Date |
| --- | --- | --- |
| 1,719,601 | Eisenberg | July 2, 1929 |
| 1,748,394 | Purfield | Feb. 25, 1930 |
| 2,245,984 | Knowles | June 17, 1941 |